UNITED STATES PATENT OFFICE.

JAMES D. MacDONELL, OF LITTLE RIVER, FLORIDA.

COMPOSITION OF MATTER FOR BRICKS.

SPECIFICATION forming part of Letters Patent No. 676,438, dated June 18, 1901.

Application filed August 11, 1900. Serial No. 26,649. (No specimens.)

*To all whom it may concern:*

Be it known that I, JAMES D. MACDONELL, a citizen of the United States, residing at Little River, Dade county, State of Florida, have invented a new and useful Composition of Matter for Bricks to be Used for all Building Purposes, Houses, Furnaces, Bridges, Fire-Bricks, and for Paving, of which the following is a specification.

My composition has the following ingredients, combined in the proportion stated for the manufacture of one thousand bricks, viz: crushed stone, three thousand four hundred pounds; cement, (any manufacture,) six hundred pounds; sulfate of copper, (or blue vitriol,) six pounds; alum, four pounds; crude carbolic acid, one-half gallon; pure water, fifty gallons. Instead of crushed stone, sand, clay, phosphate rock, shell, or coquina may be used in like proportions. These ingredients are to be thoroughly mixed by proper methods of agitation into a mortar, and then the same are put into molds, usually into which they are pressed by hydraulic or other heavy pressure, and then removed and exposed to the elements, whereby they become harder and harder, more durable, and superior in their lasting qualities and greatest usefulness.

With the use of the above composition the bricks are heavy, smooth, regular, and almost impervious to water and comparatively fireproof.

What I claim, and desire to secure by Letters Patent of the United States, is—

1. The herein-described composition of matter, consisting of water, carbolic acid, alum, sulfate of copper, cement and crushed rock, substantially as described, and for the purpose described.

2. The herein-described composition of matter, for the manufacture of bricks, consisting of three thousand four hundred pounds of crushed stone; six hundred pounds of cement; six pounds of sulfate of copper; four pounds of alum; one-half gallon of carbolic acid, fifty gallons of pure water substantially as described.

In testimony whereof I have signed my name to this specification in the presence of two subscribing witnesses.

JAMES D. MACDONELL.

Witnesses:
 MARTIN COBB,
 EDWARD D. BURR.